Figure 1:
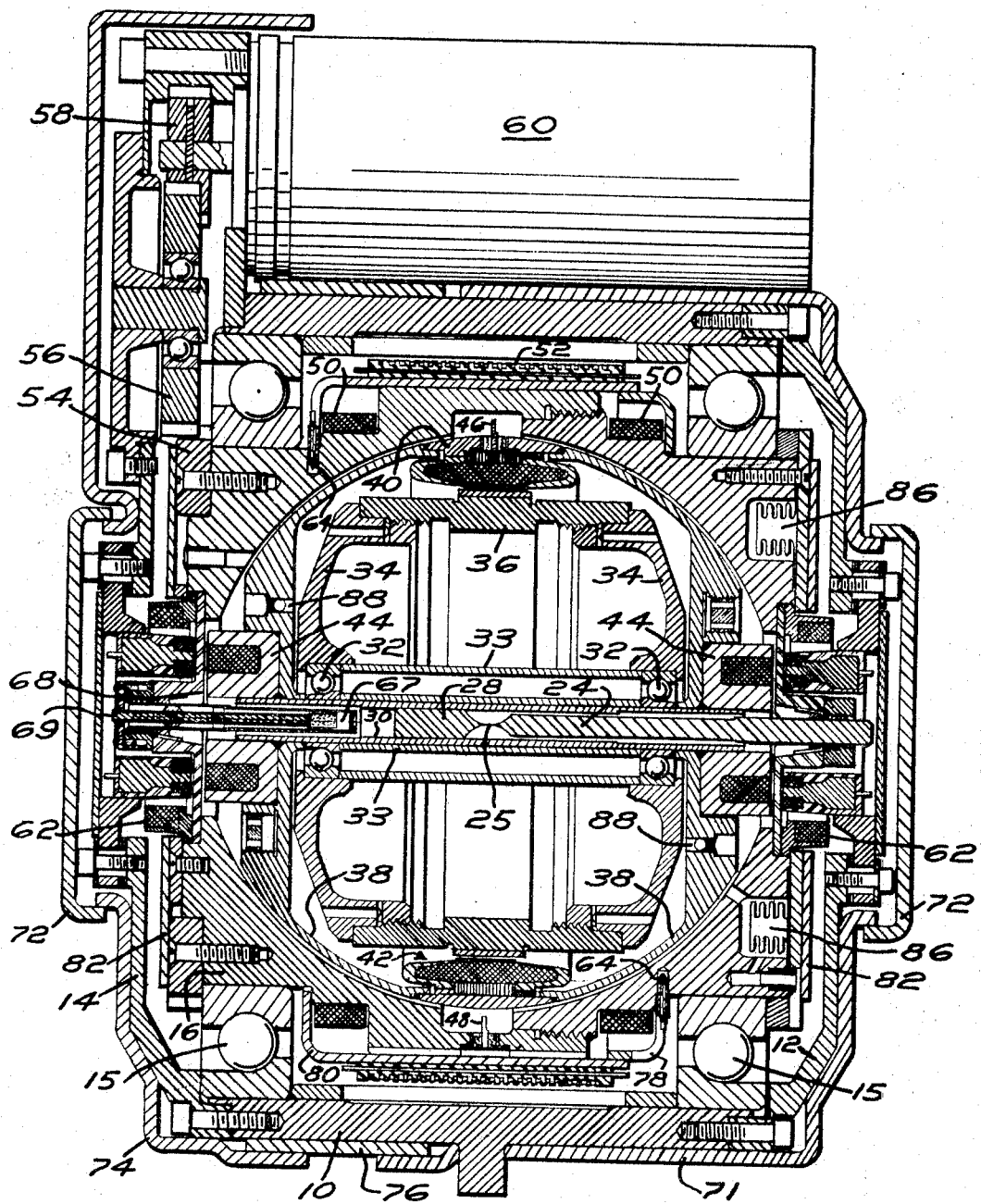

INVENTOR.
HELMUT W. E. SCHLITT

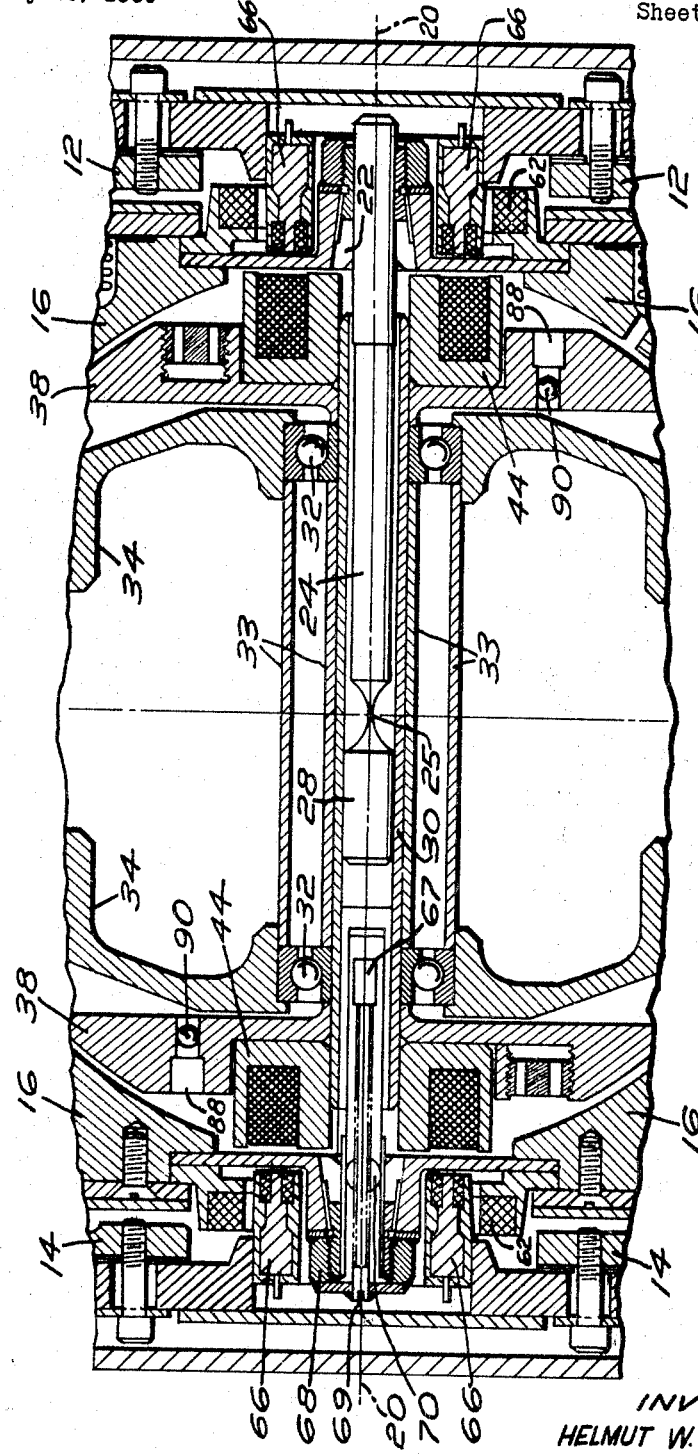

United States Patent Office 3,442,143
Patented May 6, 1969

3,442,143
GYROSCOPE
Helmut W. E. Schlitt, Williamsville, N.Y., assignor to
Bell Aerospace Corporation
Filed July 20, 1960, Ser. No. 44,226
Int. Cl. G01c 19/28, 19/06
U.S. Cl. 74—5.6                    9 Claims This invention relates to extremely high precision gyroscopes to be used for example in inertial guidance systems or with any other inertial space reference.

One of the objects of the present invention is to provide a gyroscope as aforesaid which is inherently operable with improved precision, resulting in lower drift rates and minimum errors.

Another object is to provide an improved gyroscope as aforesaid which incorporates an improved suspension system of minimum spring rate characteristics for the spinning mass.

Another object of the invention is to provide in a gyroscope as aforesaid novel means for avoiding any ill effects caused by the suspension system spring characteristics.

Another more specific object of the invention is to provide an improved gyroscope as aforesaid utilizing a rapidly spinning mass or gyroscopic element carried by a structure which is slowly rotated about the spin axis of the gyroscopic element.

Still another object of the invention is to provide in a gyroscope as aforesaid an improved device for sensing the angular position of the gyroscopic mass.

Another object of the invention is to provide in an improved gyroscope as aforesaid, an arrangement whereby suspension forces are developed to act upon the floated assembly to compensate for any anisoelastic structural torques acting upon the floated assembly.

Other objects and advantages of the invention will be apparent from the specification hereinafter including the accompanying drawings wherein:

FIG. 1 is a diametric sectional view of a two-degree-of-freedom type gyroscope embodying the present invention; and FIG. 2 is an enlarged scale view of a portion of FIG. 1.

As shown in the drawing herewith, by way of one exemplification of the invention, it is illustrated as being physically embodied in a two-degree-of-freedom type gyroscope which comprises a cylindrically shaped main housing member 10 closed at its ends by end caps 12 and 14 respectively. The housing 10 carries interiorly thereof a pair of ball bearing devices 15—15 within which is mounted a rotating frame 16 which is thereby journaled to rotate about the gyro spin axis as indicated at 20. Concentric of the axis 20, the rotating frame 16 at one end thereof includes a clamping chuck 22 which mounts in cantilever suspended relation one end of a suspension pivot bar 24 which thereby extends concentrically of said axis 20. The bar 24 includes a reduced neck portion 25 which provides a flexible suspension device of minimum flexure stiffness. The bar 24 then terminates in a slightly enlarged diameter end portion 28 which is press-fitted into a hollow axle member 30 which is dimensioned to be free to rock slightly relative to the main body portion of the bar 24. Thus, the bar 24 mounts the axle member 30 not only for the aforesaid rocking movement but also continuously rotates such axle member in unison with the frame 16, as imparted by drive means hereinafter described. A pair of bearings 32—32 are press-fitted on the axile 30 and separated by spacer tubes 33—33. The bearings 32—32 mount end bells 34—34 of the rotor structure which is completed by a peripheral ring 36. The axle 30 also mounts oppositely disposed hemisphere shaped bells 38—38 which are centrally joined by a ring 40, thereby providing the rotor case in the form of a spherical shaped float assembly.

A hysteresis motor stator assembly as indicated at 42 is press-fitted into ring 40 and encapsulated in place to synchronously drive the rotor structure, in manner well known in the art. The axle 30 also mounts in keyed relation thereon oppositely disposed excitation coil housings and coils 44—44. At intervals perimetrally of the float assembly power is supplied through flexible leads as indicated at 46-48 to the motor and excitation coils, as well known in the art.

As indicated at 50, 50 heater coils circumscribe opposite ends of the frame 16 and are energized through a slip ring assembly as indicated at 52 deriving energy from brushes (not shown) extending from the stationary frame 10; whereby as the rotating housing 16 is driven by gear train 54, 56, 58 and electric motor 60 power is supplied to the motor 42 and the coils 44 and the heaters 50. Toroidal-shaped coils 62—62 carried at opposite ends of housing 16 operate in the magnetic field generated by coils 44 to sense changes in the angular position of the floated assembly relative to housing 16. The signals from the pickup coils 62 are transmitted to a resolver (not shown) of any suitable form, whereby the rotating coordinate system is converted to a stationary coordinate system with respect to housing 10.

As shown in better detail in FIG. 2, the coils 44—44 are energized by AC current to develop fields which are sensed by the pickup coils 62—62. Also, coils 44—44 have DC currents imposed upon the AC currents therein, and the DC fields so developed react with fields developed by torquer coils 66 which are disposed at intervals radially of the gyro spin axis within the fields of the excitation coils 44—44. These reactions develop forces tending to apply torques to the floated assembly, which may be used to angularly adjust the relation between the gyro spin axis and the housing 10 about the flexure point 25 of the float suspension system.

It is a particular feature of the invention that the power supply system for the two heater coils 50—50 is initially adjusted to deliberately provide a controlled temperature throughout the floatation fluid which is different from the "true floatation temperature" of the fluid (the temperature at which the fluid density would precisely match the average density of the float assembly). The object of this procedure is to deliberately develop anisoelastic suspension forces tending to compensate for the acceleration effects of the anisoelastic characteristics of the float structure. Otherwise, such anisoelastic errors must be corrected for through means such as a complicated accelerometer-computer system, if accurate data is prerequisite. In the case of the present invention, the magnitudes and direction of the aforesaid anisoelastic acceleration errors are anticipated (by suitable bench tests) and are then compensated for by adjustments of the temperature controls regulating the average temperature by means of the heaters 50—50.

The heaters are so wired as to also permit differential temperature control thereof for more precise compensation for float balancing errors; and also to permit differential temperature control thereof for elimination of the axial float unbalance in the direction of the gyro spin axis. Thermistors as indicated at 64—64 (FIG. 1) are perimetrally spaced around both ends of the housing 16 in positions to sense the fluid temperatures at the opposite ends of the device, and convey through the slip ring assembly to the heater control system error corrections. Inasmuch as it is well known in the art how heater coils in gyroscopes may be externally energized, no illustration or further description thereof is furnished herewith.

As indicated at 67, a permanent magnet is carried in cantilever-supported fashion from one end of the axle housing 68 by means of a tube 69 which is press-fitted into the end of the axle housing plate 68 and is rotationally adjustable therein by means of a screw drive slot formed in its outer end. Intermediately of its length the tube is secondarily supported within the axle 30 by means of a spherically-shaped support 70 which is press-fitted onto the tube; but the tube 69 is eccentrically mounted in the ball 70 so that rotations of the tube vary the radial position of the magnet 67. Thus, this permanent magnet 67 may be adjusted to develop forces acting on the float assembly which are equal and opposite to the forces of the spring suspension system comprising the neck portion 25 of the bar 28 and the lead wires interconnecting the terminals 46–48 of the power supply system; for the purpose of balancing out and neutralizing the spring suspension system forces. It will of course be understood that the magnet strength will be so selected and its position will be so adjusted, as by means of screw driver adjustments during final testing of the device, so as to obtain precisely the desired spring rate cancellation results. It is another feature of the invention, that in addition to provision of magnetic shielding, as shown at 71, 72, 72, 74, 76, which is conventional, in the case of the present invention additional shielding is provided to rotate with the housing 16, as indicated at 78, 80, 82, 82. These shield members operate to prevent development of any constant torques on the gyro, even in the case where residual magnetic poles develop in the shield material.

From the above, it will be seen that the system according to this invention basically includes the main housing 10, the gyroscope having a rotor including members 34, 34 and 36 and a rotor case including members 38, 38 and 40, and a frame 16 which is isolastically connected to the gyroscope through the medium of the bar 24 (at pivot point 25). By slowly rotating a universally mounted gyroscope about an axis parallel to the spin axis of the gyroscope, drift-inducing torques acting on the stable element of the gyroscope will be sinusoidally modulated during and as a result of such rotation. In order to maintain constant magnitudes of such torques during each period of rotation, so that they will average to zero, the present invention utilizes a particular suspension system and, as well, a particular magnetic shielding system. By these means, a major portion of the drift-inducing torques may be made to average to zero so that material reduction in the random drift rate of the gyroscope may be achieved.

In the suspension system, three effects are utilized; (1) the average temperature of the floatation fluid; (2) the temperature gradient along the spin axis; (3) the balancing of positive and negative restoring forces. The average temperature of the floatation fluid may be varied to deliberately introduce anisoelastic suspension forces compensatory for acceleration effects. These acceleration effects may be predicted for any particular problem (i.e. a given missile flight), reproduced or simulated at bench tests, and the requisite average temperature rate of change programmed. The temperature gradient along the spin axis is used to make final corrections for float balancing errors and will be, in any case, only a fine adjustment. In considering the balancing of restoring forces, it will be realized that the shaft portion 25, when deflected, will impart a positive restoring force to the gyroscope relative to the frame 16, as will the necessary flexible leads to terminals 46, 48 when such deflection takes place. Moreover, it will be realized that these restoring forces will be constantly varying as the gyroscope assembly is rotated by the frame 16. The magnet 67 is so adjusted that its negative restoring force will constantly balance these positive restoring forces and therefore cancel them out so that, as aforesaid, any drift-inducing torques on the stable element will be constant during each period of rotation of the frame 16 and the gyroscope assembly so that these torques will average to zero.

The magnetic shielding 78, 80, 82, on the other hand, rotates slowly with the frame 16 so that any torques developing between this magnetic shielding and the excitation coils 44 or the spin motor 40 will be sinusoidally modulated and thereby will average out substantially to zero. Thus, an effective magnetic shield is provided which does not produce any deterioration in performance emanating from some magnetic fields or parts inside the floated gyroscope.

It will of course be appreciated that in general respects the gyroscope of the invention will also include appropriate accessory devices such as are conventional in the art. For example, a series of Sylphon bellows type fluid pressure regulators may be incorporated within the casing as indicated at 86 (FIG. 1), and filler ports as indicated at 88 are appropriately provided with sealing devices, such as pressure-fitted balls 90, as is standard practice. Also, it will be appreciated that whereas only one form of the invention has been illustrated and described hereinabove by way of one exemplification of the invention, various changes may be made therein without departing from the spirit of the invention or the scope of the following claims.

What is claimed is:

1. In a gyroscope, the combination of a main housing having drive means thereon, a frame journalled in said main housing and connected to said drive means for rotation of said frame about a predetermined axis, a hollow rotor case enclosed within said frame and including a tubular axle substantially coaxial with said predetermined axis; a suspension rod fixed at one end to said frame and projecting into said tubular axle, said suspension rod being fixed at its end remote from the frame to said axle, said suspension rod having a reduced diameter portion between its stated ends located substantially at the center of gravity of said case assembly and of minimum flexural stiffness, said suspension rod clearing said axle from said portion thereof outwardly of the axle to permit said case to rock relative to said frame, a rotor journalled on said axle, and induction means on said case for driving said rotor.

2. In a gyroscope, a main housing, a rotatable frame journalled on said main housing about a predetermined axis, means mounted on said main housing for rotatably driving said rotatable frame, a hollow case disposed within said rotatable frame and including a tubular axle disposed substantially coaxially with said predetermined axis of rotation of said rotatable frame, spring suspension means anchored at one end to said rotatable frame and projecting into said axle and secured at its opposite end thereto to drive said case in unison with said rotatable frame, a rotor rotatably mounted on said axle, said suspension means having a portion of minimum flexural rigidity located substantially at the center of gravity of said case and said rotor, and the suspension means being clear of said axle to permit the case and rotor to rock relative to said rotatable frame, means carried by said case for rotatably driving said rotor, and means projecting into said axle oppositely of said suspension means for opposing the forces of said spring suspension means.

3. The combination as defined in claim 2 wherein the last means comprises a permanent magnet rigidly mounted on said rotatable frame and disposed eccentrically of the axis of rotation thereof within said axle and displaced from the center of gravity of said case and said rotor.

4. In a fluid-suspended gyroscope, in combination,
   a main housing having drive means thereon,
   a frame journalled on said main housing and connected to said drive means for rotation about a predetermined axis,
   a hollow rotor case fluid-suspended within said frame, a gyroscope rotor journalled within said rotor case about an axis normally coincidental with said predetermined axis, drive means on said rotor case for imparting rotation to said rotor relative to said rotor case, flexible means universally connecting said rotor case to said frame for driving said rotor case in unison with said frame, the universal connection being at a point on said predetermined axis substantially at the center of gravity of said rotor and rotor case, and negative restoring means including a portion carried by said frame and a portion carried by said rotor case for opposing the restoring force of said flexible means as the latter is flexed.

5. In a fluid-suspended gyroscope, in combination, a main housing having drive means thereon, a frame journalled on said main housing and connected to said drive means for rotation about a predetermined axis, a hollow rotor case fluid-suspended within said frame, a gyroscope rotor journalled within said rotor case about an axis normally coincidental with said predetermined axis, drive means on said rotor case for imparting rotation to said rotor relative to said rotor case, flexible means universally connecting said rotor case to said frame for driving said rotor case in unison with said frame, the universal connection being at a point on said predetermined axis substantially at the center of gravity of said rotor and rotor case, said flexible means being in the form of a rod rigid at its opposite ends with said frame and said rotor case, respectively, and having an intermediate portion of reduced diameter, and negative restoring means including a tubular portion of said rotor case concentric with said predetermined axis, and a magnetic member carried by said frame and disposed within said tubular portion of the rotor case to oppose positive restoring forces occasioned by flexure of said reduced diameter portion of said rod.

6. In a fluid-suspended gyroscope, in combination, a main housing having drive means thereon, a frame journalled on said main housing and connected to said drive means for rotation about a predetermined axis, a hollow rotor case fluid-suspended within said frame, a gyroscope rotor journalled within said rotor case about an axis normally coincidental with said predetermined axis, drive means on said rotor case for imparting rotation to said rotor relative to said rotor case, flexible means universally connecting said rotor case to said frame for driving said rotor case in unison with said frame, the universal connection being at a point on said predetermined axis substantially at the center of gravity of said rotor and rotor case, excitation coil means mounted on opposites dies of said rotor case concentric with said predetermined axis, and magnetic shielding means fixed to and carried by said frame.

7. In a fluid-suspended gyroscope, a main housing, a hollow frame journalled in said main housing for rotation about a fixed, predetermined axis, a gyroscope assembly fluid-suspended within said frame, drive means on said main housing connected to said frame for rotating the latter about the aforesaid predetermined axis, said gyroscope assembly including a hollow rotor case, a rotor journalled within said rotor case and means for rotating said rotor relative to said rotor case, means connecting said frame and said rotor case for common rotation by said drive means about said predetermined axis with the axis of rotation of said rotor coincident therewith, the last mentioned means being flexible in directions normal to said predetermined axis and at a point substantially coincidental with the center of gravity of said gyroscope assembly, and negative restoring means including a portion carried by said frame and a portion carried by said rotor case for opposing restoring forces occasioned by flexure of said last mentioned means.

8. In a fluid-suspended gyroscope, a main housing, a hollow frame journalled in said main housing for rotation about a fixed, predetermined axis, a gyroscope assembly fluid-suspended within said frame, drive means on said main housing connected to said frame for rotating the latter about the aforesaid predetermined axis, said gyroscope assembly including a hollow rotor case, a rotor journalled within said rotor case and means for rotating said rotor relative to said rotor case, means connecting said frame and said rotor case for common rotation by said drive means about said predetermined axis with the axis of rotation of said rotor coincident therewith, the last mentioned means being flexible in directions normal to said predetermined axis and at a point substantially coincidental with the center of gravity of said gyroscope assembly, and negative restoring means including a portion carried by said frame and a portion carried by said rotor case for opposing restoring forces occasioned by flexure of said last mentioned means, said negative restoring means including a magnet rigid with said frame, and a metallic portion of said rotor case surrounding said magnet and movable with said rotor case relative to said magnet to oppose restoring force occasioned by flexure of said flexible means.

9. In a fluid-suspended gyroscope, a main housing, a hollow frame journalled within said main housing about a predetermined axis, a gyroscope assembly fluid-suspended within said frame, drive means on said main housing and connected to said frame for rotating the latter, flexible means connecting said frame and said gyroscope assembly for common rotation by said drive means, and means including a portion carried by said frame and a portion carried by said gyroscope assembly and acting between said frame and said gyroscope assembly for canceling out any restoring forces occasioned by flexure of said flexible means.

References Cited

UNITED STATES PATENTS

| 2,852,943 | 9/1958 | Sedgfield et al. | 74—5.7 |
| 2,856,239 | 10/1958 | Dacus | 308—10 |
| 2,871,703 | 2/1959 | Walker | 74—5.6 |
| 2,903,891 | 9/1959 | Sedgfield | 74—5.4 |
| 2,577,942 | 12/1951 | Agins | 74—5 |

ROBERT F. STAHL, *Primary Examiner.*